(12) United States Patent
Kim et al.

(10) Patent No.: US 11,504,890 B2
(45) Date of Patent: Nov. 22, 2022

(54) INSERT MOLDING APPARATUS

(71) Applicants: HYUNDAI MOTOR COMPANY, Seoul (KR); KIA MOTORS CORPORATION, Seoul (KR)

(72) Inventors: Hyun Kyung Kim, Hwaseong-si (KR); Dong Eun Cha, Hwaseong-si (KR); Jin Young Yoon, Gimpo-si (KR); Byung Kyu Yoon, Uiwang-si (KR); Hwi Sung Jung, Suwon-si (KR); Sang Hyeon Park, Seoul (KR); Ju Hyun Kwon, Seoul (KR); Seung Ryeol Lee, Seoul (KR); Yong Woo Jung, Seoul (KR); Min Jun Kim, Seoul (KR); Eon Yeon Jo, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 238 days.

(21) Appl. No.: 16/881,414

(22) Filed: May 22, 2020

(65) Prior Publication Data

US 2020/0376728 A1    Dec. 3, 2020

(30) Foreign Application Priority Data

May 27, 2019  (KR) .......................... 10-2019-0062000
Jul. 2, 2019   (KR) .......................... 10-2019-0079263

(51) Int. Cl.
*B29C 45/14*   (2006.01)
*B29C 45/26*   (2006.01)
(Continued)

(52) U.S. Cl.
CPC .... *B29C 45/14073* (2013.01); *B29C 45/1418* (2013.01); *B29C 45/2681* (2013.01);
(Continued)

(58) Field of Classification Search
CPC .......... B29C 45/14073; B29C 45/1418; B29C 45/2681; B29C 45/67; B29C 2045/1486; B29C 2045/648; B29C 45/14065; B29C 45/26; B29C 45/14008; B29C 2045/14098; B29C 2045/14131; B29C 2045/14139; B29C 2045/14147; B29C 2045/1427;
(Continued)

(56) References Cited

U.S. PATENT DOCUMENTS

2017/0182729 A1*  6/2017  Fox ........................ B32B 27/06

FOREIGN PATENT DOCUMENTS

EP          2168750 A1 *  3/2010  ....... B29C 45/14065
KR   10-2011-0019680 A    2/2011

* cited by examiner

*Primary Examiner* — Jacob T Minskey
*Assistant Examiner* — S. Behrooz Ghorishi
(74) *Attorney, Agent, or Firm* — Lempia Summerfield Katz LLC (57) ABSTRACT

An insert molding apparatus includes: a lower mold including a seating part on which an insert member including a through-hole is seated; an upper mold mounted on the lower mold to receive the insert member seated on the seating part; and a first fixing part including a first head provided in the lower mold and inserted into the through-hole of the insert member when the insert member is seated, and a first drive unit that moves the first head. The first drive unit is moved to adjust a length by which the first head is inserted into the through-hole.

11 Claims, 12 Drawing Sheets

(51) Int. Cl.
    *B29C 45/67*          (2006.01)
    *B29L 31/30*          (2006.01)
    *B29C 45/64*          (2006.01)

(52) U.S. Cl.
    CPC ...... *B29C 45/67* (2013.01); *B29C 2045/1486* (2013.01); *B29C 2045/648* (2013.01); *B29L 2031/3005* (2013.01)

(58) Field of Classification Search
    CPC ... B29C 2045/14327; B29L 2031/3005; B29L 2031/30
    See application file for complete search history.

INSERT MOLDING APPARATUS

CROSS-REFERENCE TO RELATED APPLICATIONS

This application claims priority to and the benefit of Korean Patent Application Nos. 10-2019-0062000, filed on May 27, 2019 and 10-2019-0079263, filed on Jul. 2, 2019, the entirety of each of which are incorporated herein by reference.

FIELD

The present disclosure relates to an insert molding apparatus.

BACKGROUND

The statements in this section merely provide background information related to the present disclosure and may not constitute prior art.

In general, roof racks are symmetrically mounted on opposite sides of a roof panel of a vehicle to load things on the top of the vehicle. One example of roof racks is disclosed in Korean Patent Publication No. 10-2011-0019680 (entitled "Side Bar Assembly of Roof Carrier for Vehicle").

In recent years, a technology for manufacturing a roof rack by injection-molding a material such as plastic instead of aluminum for lightweight of the roof rack has attracted attention. In particular, studies on a technology for insert-molding a reinforcement member for an improvement in the strength of a roof rack made of plastic have been increasingly conducted.

Meanwhile, in an apparatus for insert-molding a roof rack, the molding position of a reinforcement member may be changed due to a flow of a moldable material or an unexpected external impact in a process. Accordingly, an insert defect rate may be raised.

SUMMARY

An aspect of the present disclosure provides an insert molding apparatus for reducing or minimizing an insert defect rate by effectively fixing an insert member during insert molding.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an insert molding apparatus includes: a lower mold including a seating part on which an insert member including a through-hole is seated; an upper mold mounted on the lower mold to receive the insert member seated on the seating part; and a first fixing part including a first head provided in the lower mold and inserted into the through-hole of the insert member when the insert member is seated, and a first drive unit that moves the first head. The first drive unit is moved to adjust a length by which the first head is inserted into the through-hole.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to an insert molding apparatus. Hereinafter, exemplary forms of the present disclosure will be described in detail with reference to the accompanying drawings such that those skilled in the art to which the present disclosure pertains can readily carry out the present disclosure. However, the present disclosure may be implemented in various different forms and is not limited to the forms described herein. In drawings, components irrelevant to the description are omitted for the simplicity of explanation, and like reference numerals denote like components through the entire specification.

Figure 1:
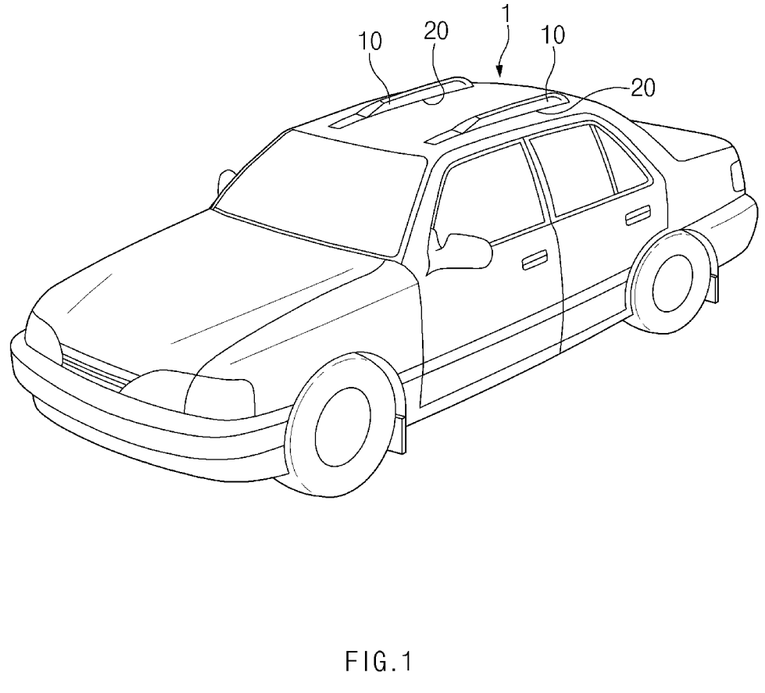
FIG. 1 is a view illustrating roof racks mounted on a roof panel of a vehicle.

FIG. 1 is a view illustrating roof racks mounted on a roof panel of a vehicle. Specifically, in FIG. 1, a roof rack 10 is fixedly installed through a fastening member (not illustrated)

in a state in which a rail 11 extending along a lengthwise direction and forming a main body is mounted on a roof 1 of a vehicle.

Figure 2:
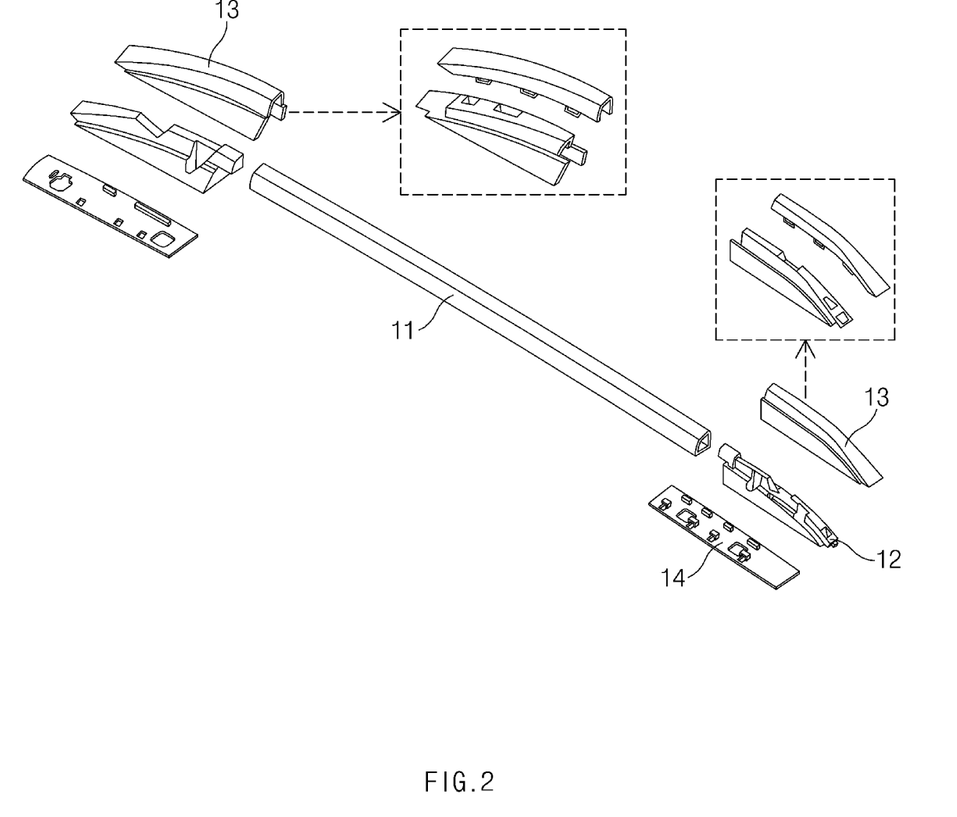
FIG. 2 is a view illustrating a configuration of the roof rack.

FIG. 2 is a view illustrating a configuration of the roof rack. More specifically, in FIG. 2, the roof rack 10 in the related art includes the rail 11, stanchions 12 provided on opposite longitudinal end portions of the rail 11, covers 13, and pads 14. The rail 11 having a uniform cross-sectional shape is extruded of an aluminum material, and the stanchions 12 made of a synthetic resin are injection molded due to the nature of a three-dimensional curved surface shape thereof.

Figure 3:
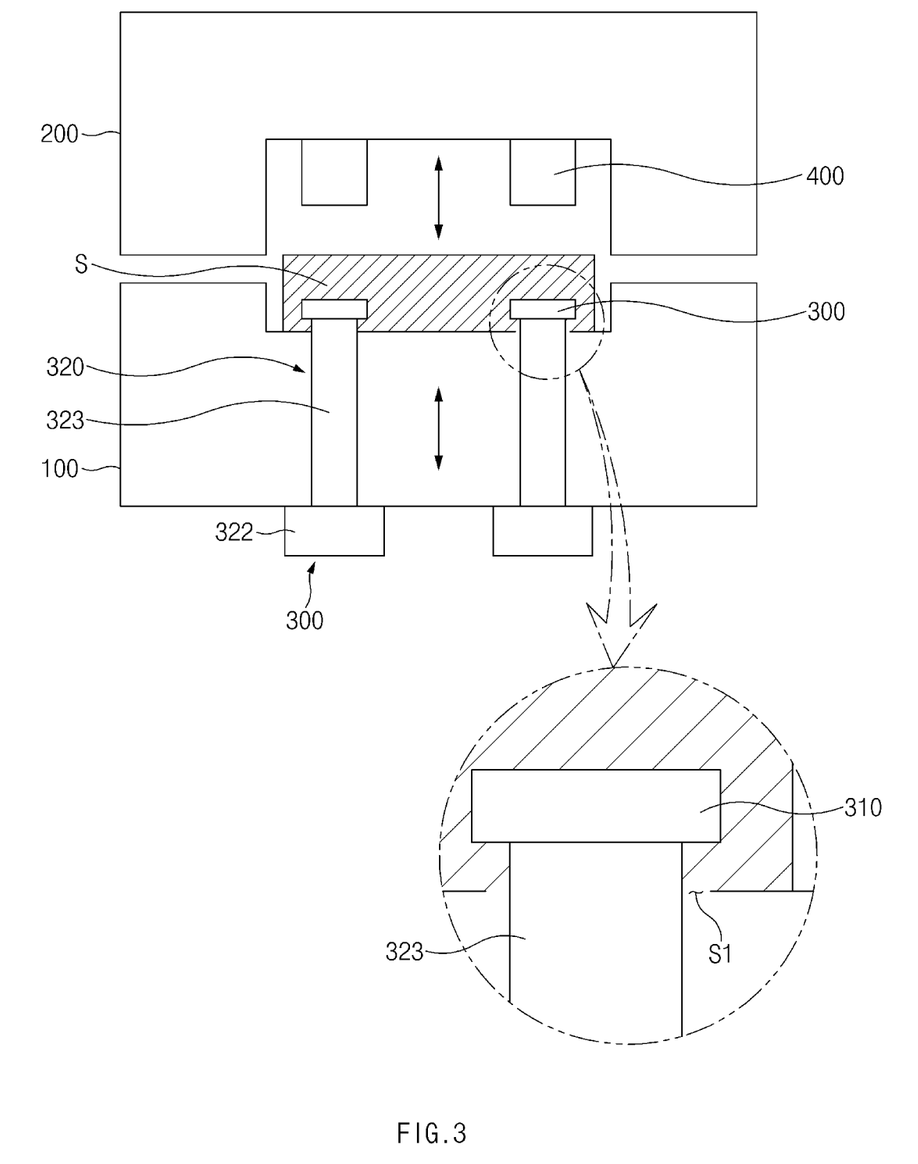
FIG. 3 is a view illustrating a configuration of an exemplary insert molding apparatus in one form of the present disclosure.
Figure 4:
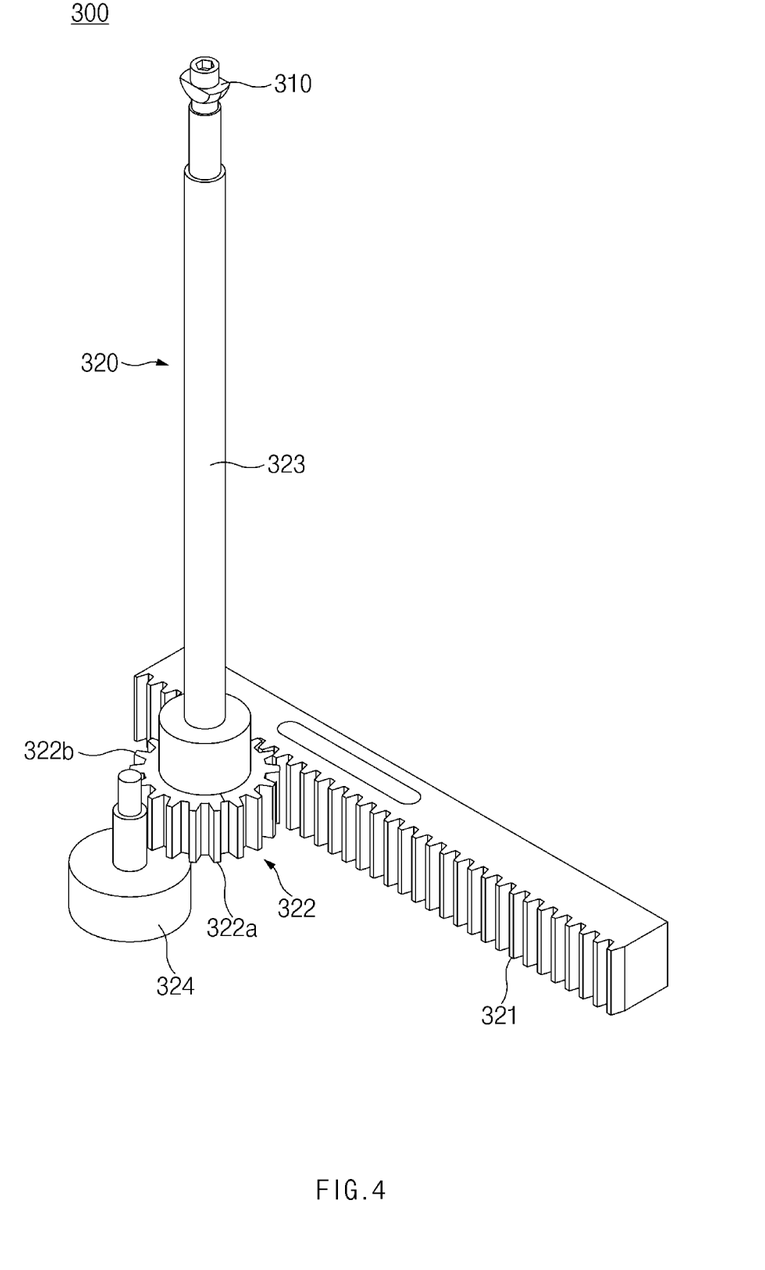
FIG. 4 is a detailed view illustrating a first fixing part in the insert molding apparatus illustrated in FIG. 3.
Figure 5:
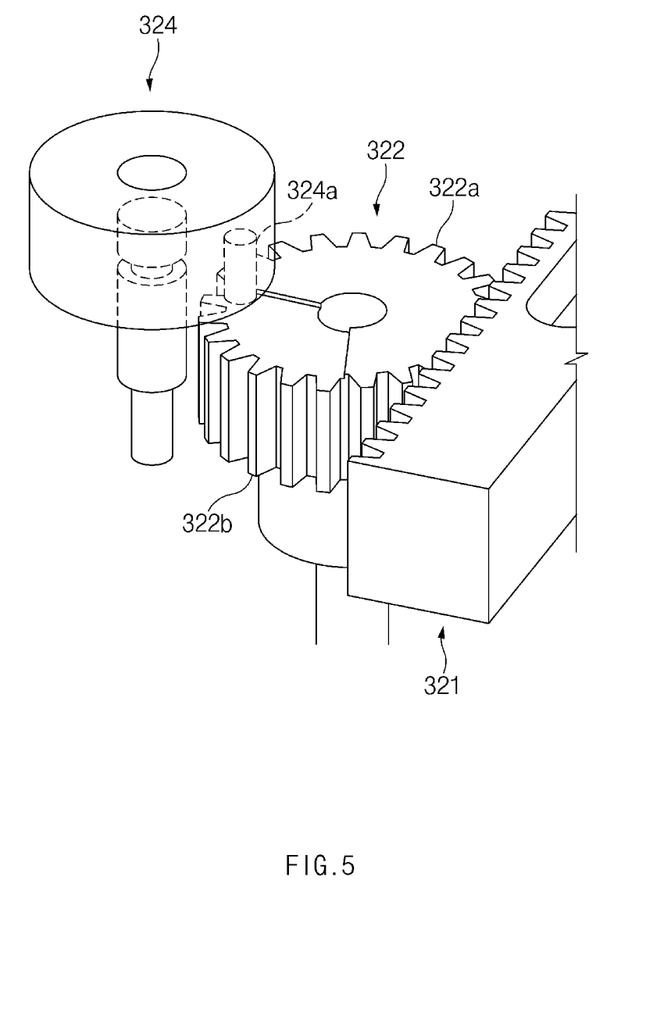
FIG. 5 is a detailed view illustrating a first drive unit in the first fixing part illustrated in FIG. 4.
Figure 6:
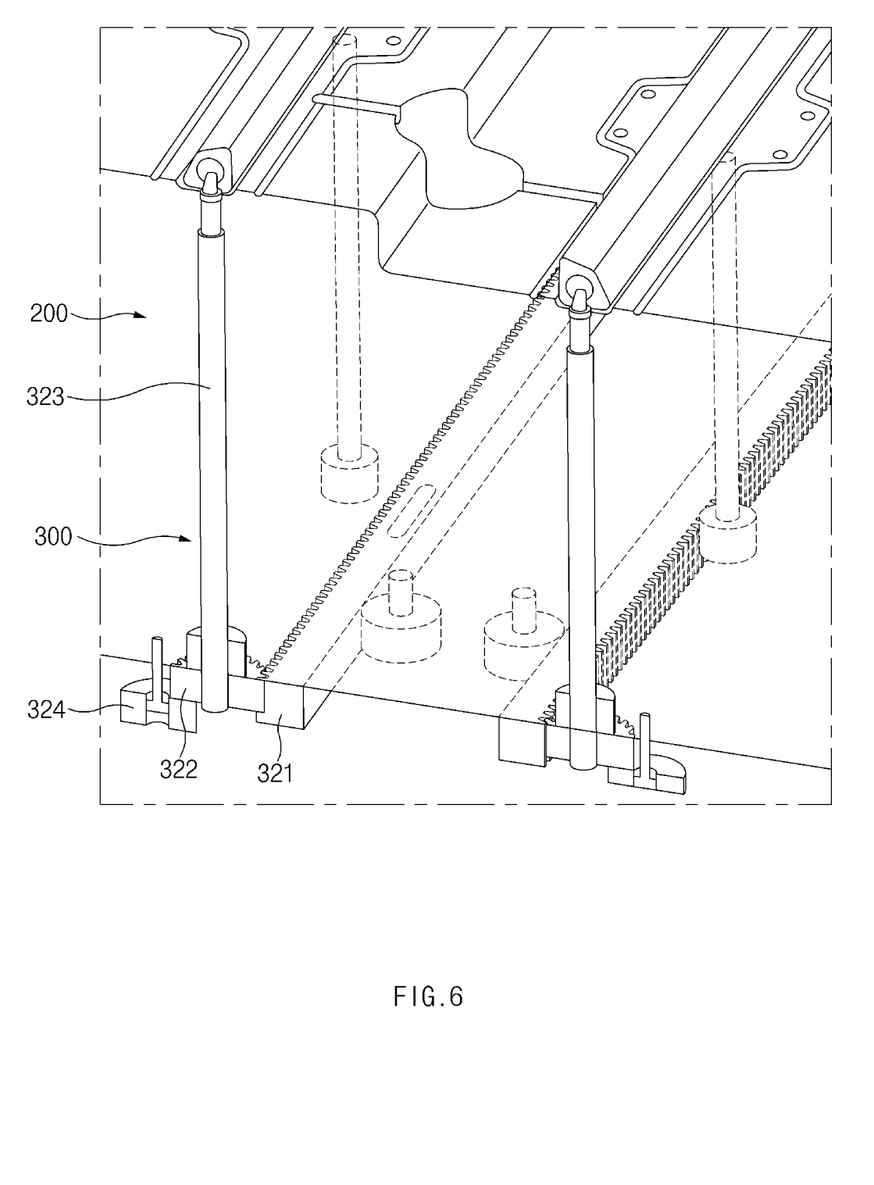
FIG. 6 is an exemplary view illustrating the first fixing part provided in a lower mold of the insert molding apparatus illustrated in FIG. 3.
Figure 7:
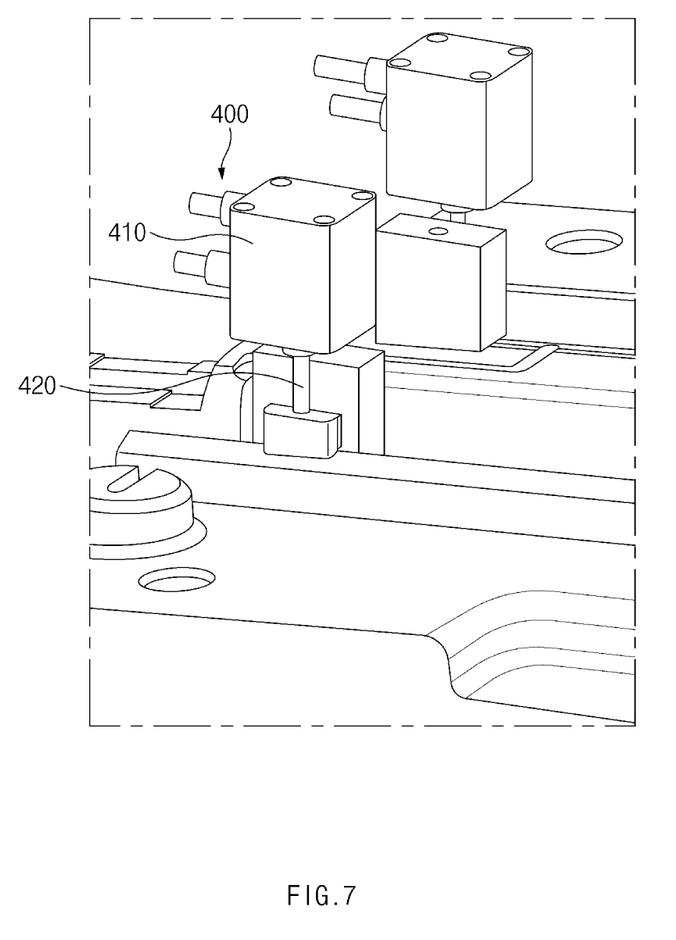
FIG. 7 is an exemplary view illustrating a second fixing part provided in an upper mold of the insert molding apparatus illustrated in FIG. 3.

FIG. 3 is a view illustrating a configuration of an exemplary insert molding apparatus in some forms of the present disclosure. FIG. 4 is a detailed view illustrating a first fixing part in the insert molding apparatus illustrated in FIG. 3. FIG. 5 is a detailed view illustrating a first drive unit in the first fixing part illustrated in FIG. 4. FIG. 6 is an exemplary view illustrating the first fixing part provided in a lower mold of the insert molding apparatus illustrated in FIG. 3. FIG. 7 is an exemplary view illustrating a second fixing part provided in an upper mold of the insert molding apparatus illustrated in FIG. 3.

FIG. 4 is a schematic view illustrating the insert molding apparatus in one form of the present disclosure.

Referring to FIGS. 4 to 7, the insert molding apparatus includes the lower mold 100, the upper mold 200, and the first fixing part 300.

The lower mold 100 includes a seating part on which an insert member S including a through-hole S1 is seated. At least one through-hole S1 provided in the insert member S is a portion into which a first head 310, which will be described below, is inserted. When the insert member S includes two or more through-holes S1, the through-holes S1 may be formed in positions of the insert member S that are symmetric to each other.

The upper mold 200 is mounted on the lower mold 100 to receive the insert member S seated on the seating part. The upper mold 200 and the lower mold 100 may include an injection part (not illustrated) through which a moldable material is injected. For example, in a state in which the upper mold 200 and the lower mold 100 are closed, the moldable material may be injected, through the injection parts, into a receiving space in which the insert member S is seated. The moldable material injected surrounds the insert member S and is insert-molded at a predetermined temperature and pressure.

The first fixing part 300 includes: the first head 310 provided in the lower mold 100 and inserted into the through-hole S1 of the insert member S when the insert member S is seated; and the first drive unit 320 for moving the first head 310.

The first head 310 may protrude toward the upper mold 200 from the seating part. As the first head 310 is inserted into the through-hole S1 of the seated insert member S, the first head 310 may arrange and fix the position of the insert member S.

The first drive unit 320 is moved to adjust the length by which the first head 310 is inserted into the through-hole S1. For example, the first drive unit 320 may move the first head 310 depending on whether the insert member S is seated or not. When the insert member S is seated, the first drive unit 320 may lower the first head 310 toward the lower mold 100. In one form, when the first head 310 is lowered, the insertion length becomes shorter. The expression "becomes shorter" means that after the first head 310 is moved, the insertion length becomes shorter than before the first head 310 is moved.

In some forms of the present disclosure, when the first head 310 is lowered by the first drive unit 320, the first head 310 may be stopped by the through-hole S1. As the first head 310 is stopped by the through-hole S1, the first head 310 may press the insert member S toward the lower mold 100, thereby improving a force by which the insert member S is fixed.

In some forms of the present disclosure, the first drive unit 320 may include: a drive gear 321; a driven gear 322 that is engaged with the drive gear 321 and has a first surface 322a and a second surface 322b facing away from the first surface 322a and also has a step area concavely formed from at least a partial area of the first surface 322a toward the second surface 322b; a shaft 323 mounted on the second surface 322b of the driven gear 322 and connected with the first head 310; and a support member 324 for supporting the first surface 322a of the driven gear 322. As the driven gear 322 rotates, a contact point between the support member 324 and the first surface 322a may be changed, and the first head 310 may be moved based on the contact point.

The contact point is continuously changed depending on rotation of the driven gear 322. For example, when the contact point is in a non-step area of the first surface 322a, the first head 310 may not be moved, and when the contact point is in the step area, the first head 310 may be moved. The movement refers to a movement in the vertical direction, and in the present disclosure, an upward movement refers to a movement toward the upper mold 200, and a downward movement refers to a movement toward the lower mold 100. Furthermore, the non-step area refers to a flat area other than the depression on the first surface 322a.

In some forms of the present disclosure, when the contact point is in the step area, the first head 310 may be lowered. The interval by which the first head 310 is lowered is determined by the depth of the depression. That is, the first head 310 may be lowered by the same interval as the depth of the depression.

In one form, the drive gear 321 may be a rack gear that performs linear motion, and the driven gear 322 may be a pinion gear that performs rotary motion. The rack gear may perform linear motion, and the pinion gear may perform rotary motion. For example, when the rack gear moves forward, the pinion gear may rotate in a first direction, and when the rack gear moves backward, the pinion gear may rotate in a second direction opposite to the first direction.

The support member 324 may be disposed to be spaced apart from the driven gear 322, and the support member 324 may include: a contact member 324a that protrudes from at least a partial area thereof and that is brought into contact with the first surface 322a of the driven gear 322. On the support member 324, the position of the contact member 324a is fixed. As the position of the contact member 324a is fixed, a contact point between the first surface 322a and the contact member 324a is dependent on rotation of the driven gear 322.

In some forms of the present disclosure, when the first head 310 is lowered, the first head 310 may press the insert member S toward the lower mold 100. When the first head 310 is lowered, at least a partial area of the first head 310 is brought into contact with a peripheral portion of the through-hole S1. The peripheral portion refers to an inner surface S2 of the insert member S (refer to FIGS. 9 and 11). The first head 310 may press the insert member S toward the lower mold 100 by being brought into contact with the inner surface S2 of the insert member S.

In some forms of the present disclosure, in a process of movement, the first head 310 may rotate about the center of the shaft 323. The first head 310 may rotate in the same direction as the rotational direction of the driven gear 322, and the radius of rotation may range from 0° to 90°. When the first head 310 rotates, the contact member 324a may be brought into contact with the non-depression area of the driven gear 322. That is, when the contact point is in the non-depression area, the first head 310 may rotate, and when the contact point is in the depression area, the first head 310 may move downward.

Figure 8:
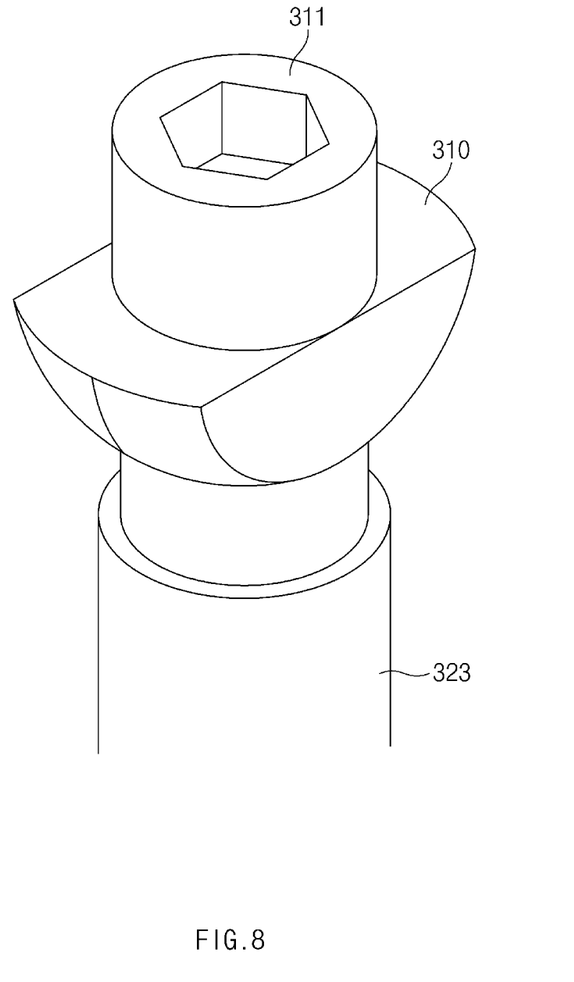
FIG. 8 is a detailed view illustrating the shape of a first head inserted into an insert member when the insert member is seated.
Figure 9:
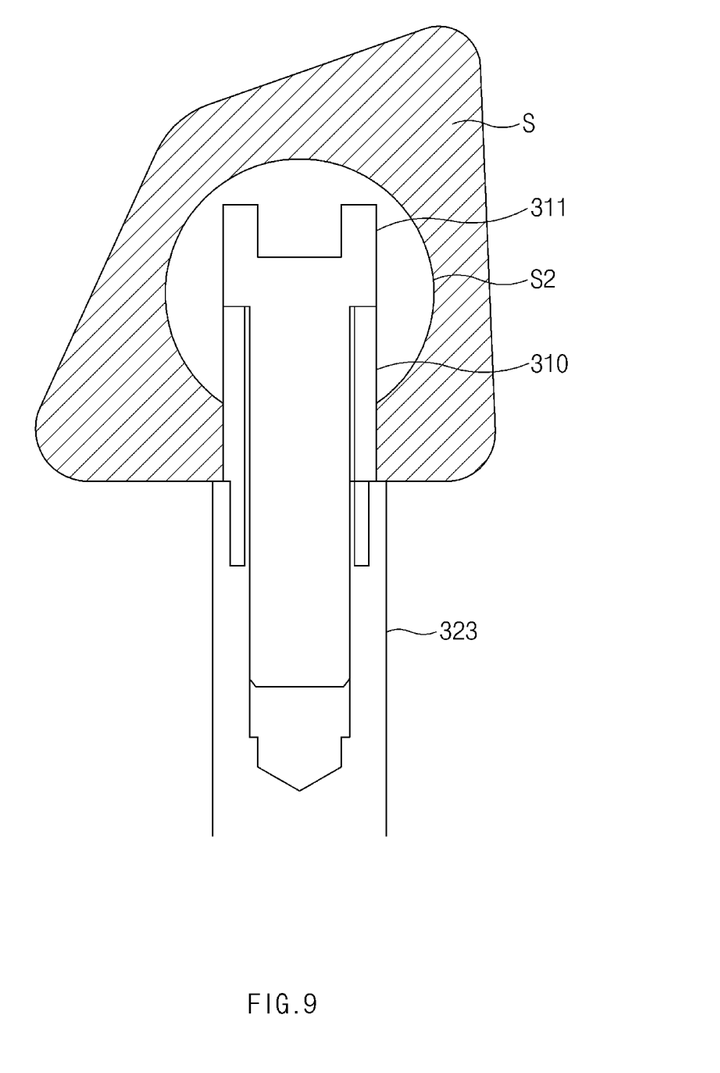
FIG. 9 is a detailed sectional view illustrating the insert member and the first head inserted into the insert member when the insert member is seated.
Figure 10:
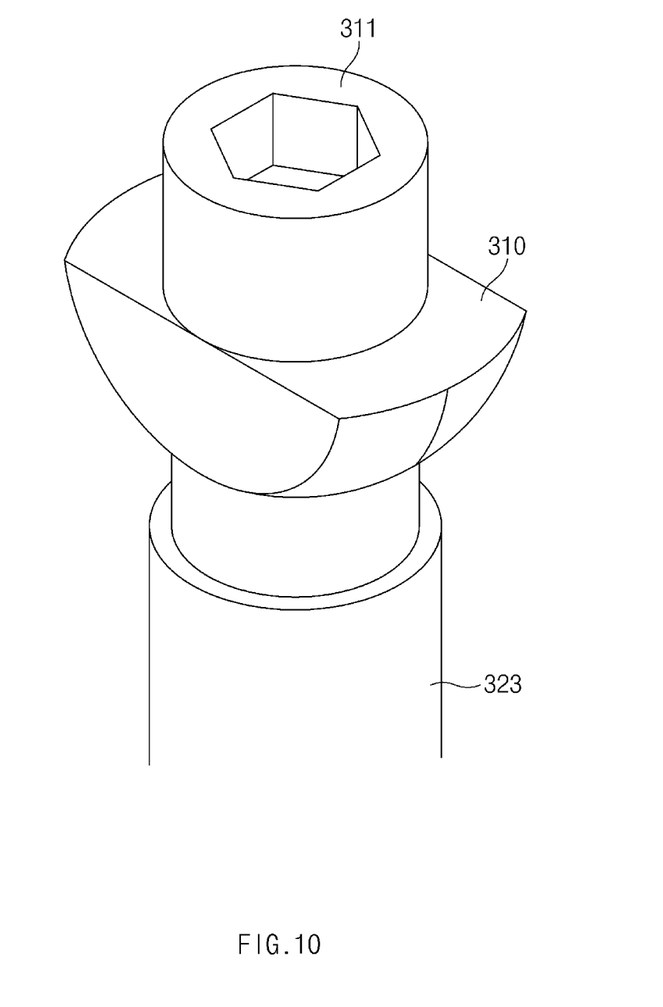
FIG. 10 is a detailed view illustrating the shape of the first head when the first head is lowered.

FIG. 8 is a detailed view illustrating the shape of the first head inserted into the insert member when the insert member is seated, and FIG. 9 is a detailed sectional view illustrating the insert member and the first head inserted into the insert member when the insert member is seated. FIG. 10 is a detailed view illustrating the shape of the first head when the first head is lowered, and FIG. 11 is a detailed sectional view illustrating the insert member and the first head when the first head is lowered.

Figure 11:
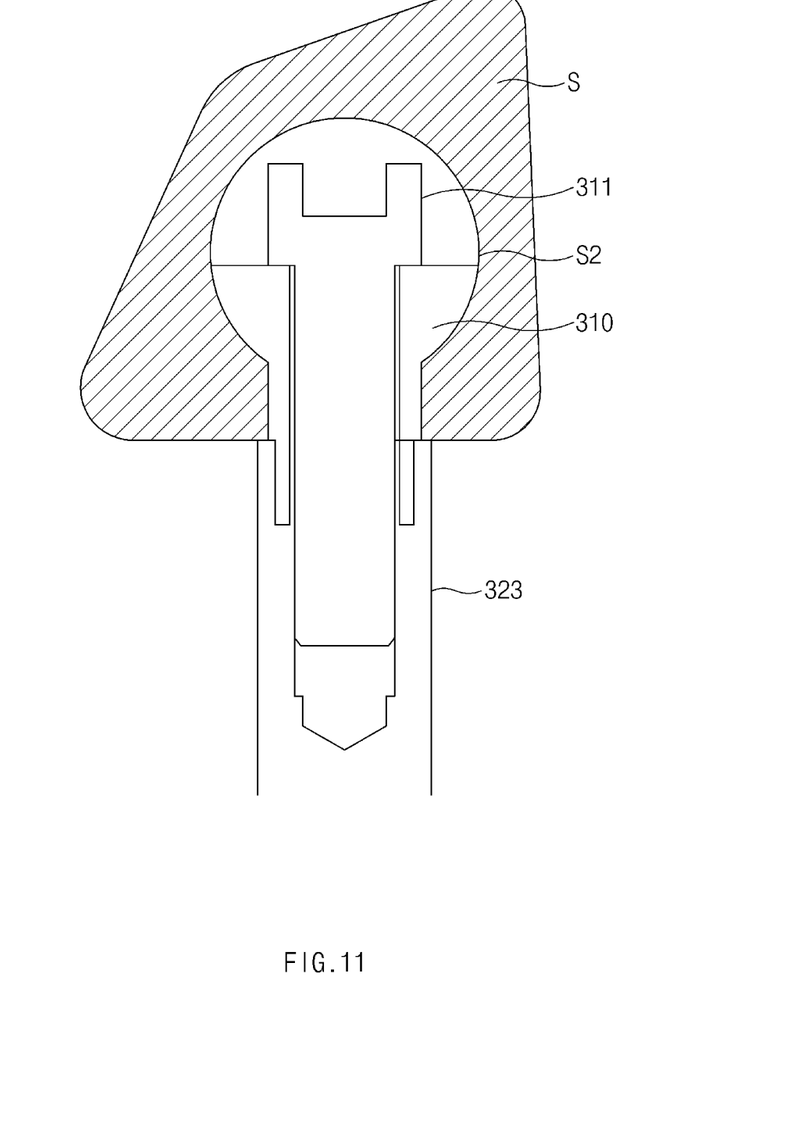
FIG. 11 is a detailed sectional view illustrating the insert member and the first head when the first head is lowered.

In some forms of the present disclosure, referring to FIGS. 8 to 11, the first head 310, when inserted, may be lowered in a state of being rotated by a certain angle based on the position of the first head 310. As illustrated in FIGS. 10 and 11, the first head 310, when inserted, may be brought into contact with the inner surface S2 of the insert member S in the state of being rotated by the certain angle based on the position of the first head 310. When the first head 310 is lowered in the state of being brought into contact with the inner surface S2 of the insert member S, the insert member S is pressed toward the lower mold 100.

Furthermore, the first fixing part 300 may further include a fixing member 311 for fixing the first head 310 to the shaft 323. The fixing member 311 may be, for example, a fixing bolt.

In some forms of the present disclosure, when the insert member S is orthogonally projected onto a virtual plane parallel to a seating surface of the insert member S, at least a partial area of the first head 310 may be located outside the through-hole S1 depending on rotation. The area located outside the through-hole S1 may be brought into contact with the inner surface S2 of the insert member S when the first head 310 is lowered. In another form, in the case where the insert member S is orthogonally projected onto the virtual plane as described above, the first head 310 may be located inside the through-hole S1 when first inserted into the through-hole S1.

In another form, the insert molding apparatus may include the second fixing part 400. The second fixing part 400 may include: a second head 420 that is mounted in the upper mold 200 and that fixes the insert member S when the insert member S is seated; and a second drive unit 410 that moves the second head 420. The second fixing part 400 may fix the insert member S by pressing an upper surface of the insert member S.

In some forms of the present disclosure, the second drive unit 410 may be a hydraulic cylinder. In one form, a movement of the second drive unit 410 may be controlled through a controller having a timer function.

In another form, the second fixing part 400 may move the second head 420, based on whether the moldable material is introduced or not. Specifically, when the moldable material is introduced, the second head 420 may be raised and spaced apart from the insert member S at a certain interval. In contrast, when no moldable material is introduced, the second head 420 may be lowered and may press the insert member S to fix the insert member S.

The insert molding apparatus in one form of the present disclosure may be an apparatus for insert-molding a vehicle part, and the vehicle part may be a roof rack.

Figure 12:
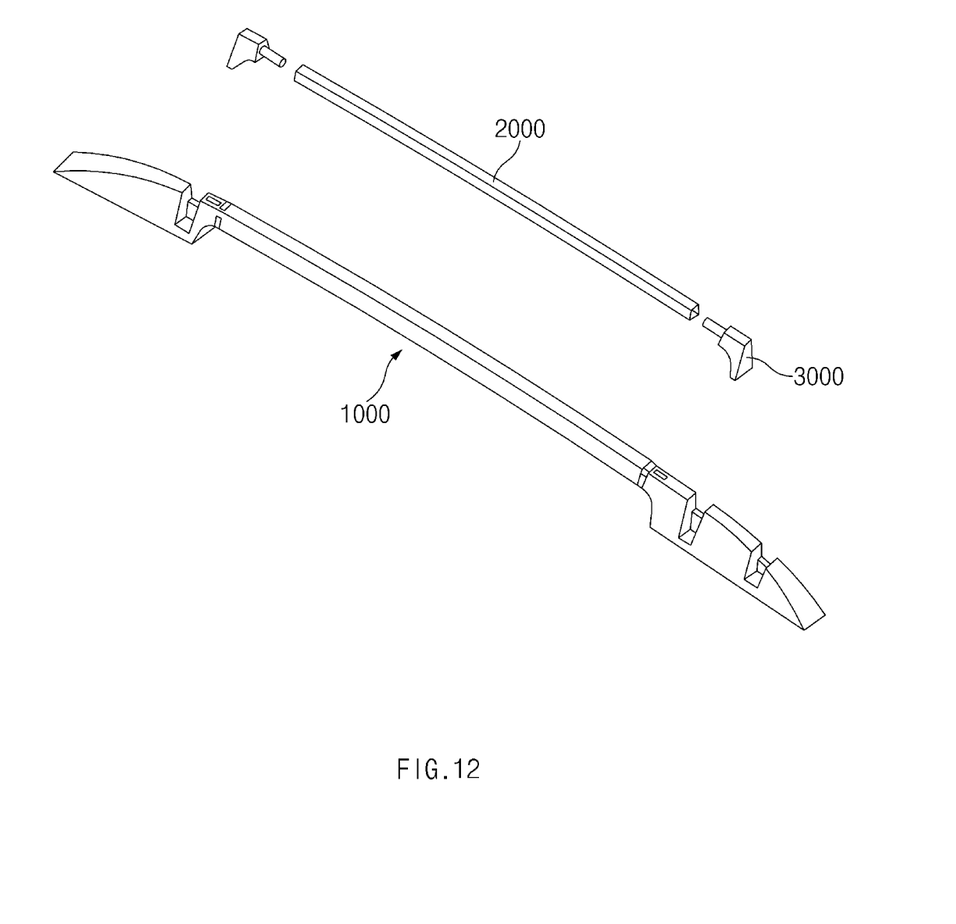
FIG. 12 is a view illustrating a configuration of a roof rack manufactured with the insert molding apparatus illustrated in FIG. 3.

FIG. 12 is a view illustrating a configuration of a roof rack manufactured with the insert molding apparatus illustrated in FIG. 3.

Referring to FIG. 12, the roof rack includes a main body 1000, a hollow profile 2000, and a cap 3000.

The main body 1000 includes a rail and support parts. The rail extends along a lengthwise direction and forms a body, and the support parts are provided on opposite longitudinal end portions of the rail in the lengthwise direction. For example, the support parts may be integrally formed on the opposite longitudinal end portions of the rail in the lengthwise direction through the above-described insert molding apparatus.

The hollow profile 2000 may be the insert member S described above. Specifically, the hollow profile 2000 extends along the lengthwise direction of the rail and is integrally formed inside the rail. The hollow profile 2000 has one or more through-holes formed in one surface thereof that faces a roof panel of a vehicle. The surface facing the roof panel of the vehicle may be the same as the above-described seating surface.

The hollow profile 2000 may be a reinforcement member for increasing the strength of the main body 1000. Specifically, the rail may contain a hollow portion extending along the lengthwise direction, and inner surfaces of the rail that form the hollow portion may make contact with the entire area of an outer surface of the hollow profile 2000. As the entire area of the outer surface of the hollow profile 2000 is brought into contact with the inner surfaces of the rail, the strength of the main body 1000 may be improved. The hollow profile 2000 may have a rod shape having a hollow portion (an interior space) along a lengthwise direction thereof. Furthermore, the length of the hollow profile 2000 may be equal to or shorter than the length of the rail.

The main body 1000 may be simultaneously molded with the hollow profile 2000 through insert molding. As the main body 1000 and the hollow profile 2000 of the roof rack are integrally molded by insert molding, the number of processes (assembly/production) may be simplified, and thus manufacturing costs may be reduced. In addition, the roof rack manufactured by insert molding may have a high design degree of freedom and may have a luxurious appearance.

The roof rack may further include the cap 3000 mounted on at least one of opposite longitudinal end portions of the hollow profile 2000 and disposed inside the main body 1000. For example, the caps 3000 may be mounted on the opposite longitudinal end portions of the hollow profile 2000 to seal the interior space of the hollow profile 2000. The hollow profile 2000 may be insert-molded while the caps 3000 are mounted on the opposite longitudinal end portions of the hollow profile 2000. As the caps 3000 are insert-molded in the state of being mounted on the opposite longitudinal end portions of the hollow profile 2000, the caps 3000 may be disposed inside the main body 1000 and may not be visible from outside the roof rack. As the caps 3000 seal the interior space of the hollow profile 2000, the caps 3000 serve to inhibit the moldable material of the rail from being introduced into the interior space of the hollow profile 2000 during insert molding. Furthermore, the size of the caps 3000 may be greater than the diameter of the hollow profile 2000. Here, the size of the caps 3000 refers to a length in the longest dimension. As the caps 3000 are formed to have a size larger than the diameter of the hollow profile 2000, a coupling force between the main body 1000 and the hollow profile 2000 may be improved, and thus the hollow profile 2000 may be inhibited or prevented from being separated from the main body 1000 when an external impact is applied. Furthermore, the caps 3000 may contribute to improving the settlement of the hollow profile 2000 in the above-described insert molding apparatus during insert molding.

According to some forms of the present disclosure, the insert molding apparatus may reduce or minimize an insert defect rate by effectively fixing the insert member during insert molding.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An insert molding apparatus comprising:
   a lower mold including a seating part on which an insert member including a through-hole is seated;
   an upper mold mounted on the lower mold and configured to receive the insert member seated on the seating part; and
   a first fixing part including:
      a first head provided in the lower mold and inserted into the through-hole of the insert member when the insert member is seated, and
      a first drive unit configured to move the first head,
   wherein the first drive unit is moved to adjust a length by which the first head is inserted into the through-hole,
   wherein the first drive unit includes:
   a drive gear;
   a driven gear engaged with the drive gear and including:
      a first surface, and
      a second surface facing away from the first surface and having a step area concavely formed from at least a partial area of the first surface toward the second surface;
   a shaft mounted on the second surface of the driven gear and connected with the first head; and
   a support part brought into contact with the first surface of the driven gear and configured to support the driven gear, and
   wherein a contact point between the support part and the first surface is changed based on rotation of the driven gear, and the first head is moved based on the contact point.

2. The insert molding apparatus of claim 1, wherein the first head is lowered when the contact point is in the step area.

3. The insert molding apparatus of claim 1, wherein the drive gear is a rack gear, and the driven gear is a pinion gear.

4. The insert molding apparatus of claim 1, wherein:
   the support part is disposed to be spaced apart from the driven gear, and
   the support part includes a contact member protruding from at least a partial area thereof and brought into contact with the first surface of the driven gear.

5. The insert molding apparatus of claim 1, wherein the first head is configured to rotate about a center of the shaft in a process of movement.

6. The insert molding apparatus of claim 5, wherein at least a partial area of the first head is located outside of the through-hole based on rotation when the insert member is orthogonally projected onto a virtual plane parallel to a seating surface of the insert member.

7. The insert molding apparatus of claim 1, wherein the first head is configured to press the insert member toward the lower mold when the first head is lowered.

8. The insert molding apparatus of claim 1, further comprising:
   a second fixing part including:
      a second head mounted in the upper mold and configured to fix the insert member when the insert member is seated; and
      a second drive unit configured to move the second head.

9. The insert molding apparatus of claim 8, wherein the second drive unit is a hydraulic cylinder.

10. The insert molding apparatus of claim 8, wherein the second fixing part is configured to move the second head, based on whether a moldable material is introduced or not.

11. The insert molding apparatus of claim 10, wherein the second head is raised and spaced apart from the insert member at a certain interval when the moldable material is introduced.

* * * * *